March 24, 1970 G. L. BEARDSLEY 3,502,306
CEMENT MIXING APPARATUS
Filed May 29, 1968 3 Sheets-Sheet 1

Glenn L. Beardsley
INVENTOR.

March 24, 1970  G. L. BEARDSLEY  3,502,306
CEMENT MIXING APPARATUS
Filed May 29, 1968  3 Sheets-Sheet 2
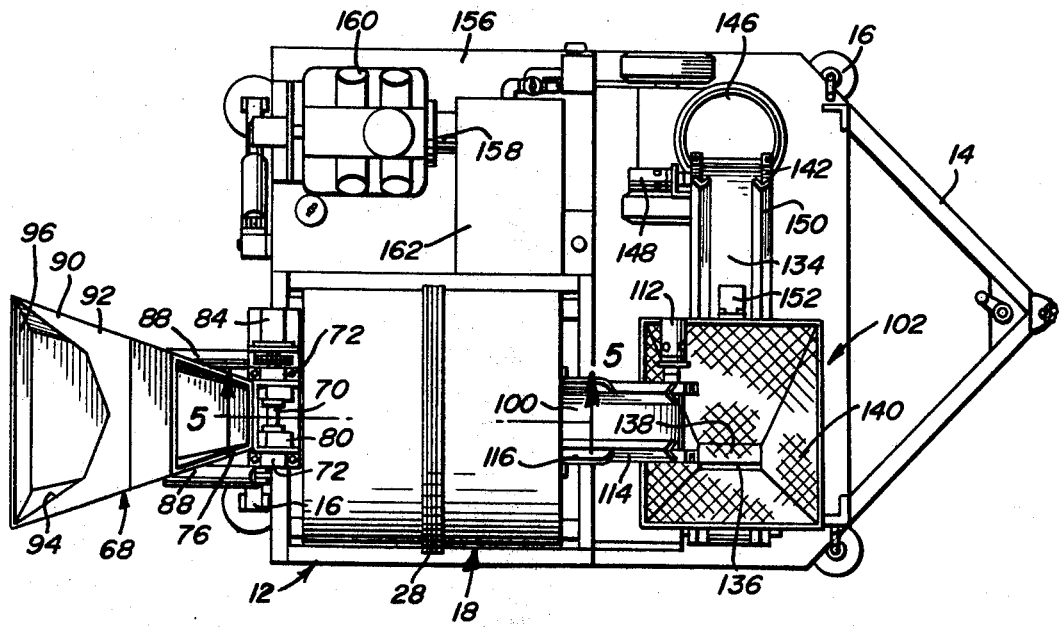
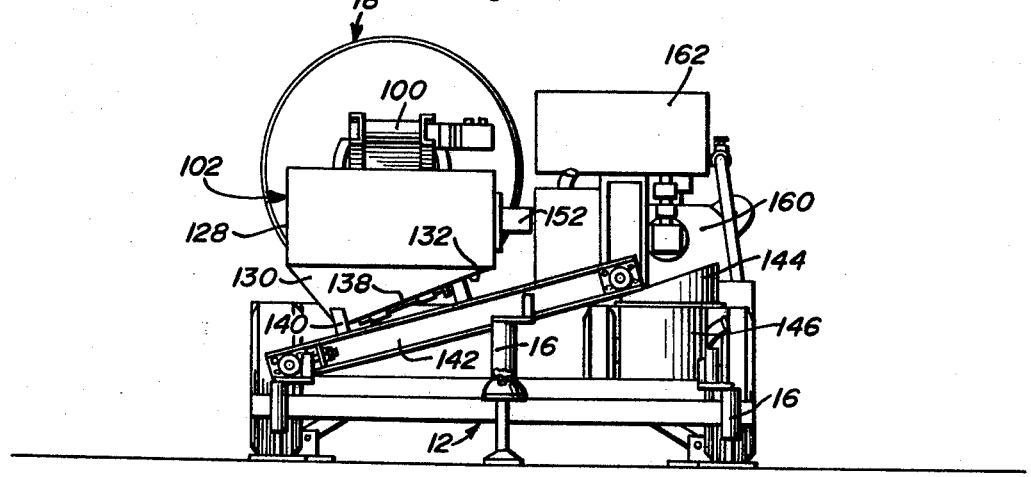
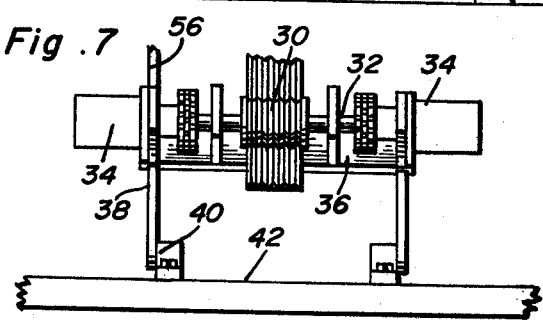
Glenn L. Beardsley
INVENTOR.
BY *Clarence A. O'Brien*
and *Harvey B. Jacobson*
Attorneys March 24, 1970 G. L. BEARDSLEY 3,502,306
CEMENT MIXING APPARATUS Filed May 29, 1968 3 Sheets-Sheet 3

Glenn L. Beardsley
INVENTOR.

United States Patent Office 3,502,306
Patented Mar. 24, 1970

3,502,306
CEMENT MIXING APPARATUS
Glenn L. Beardsley, 1421 S. 22nd Ave.,
Phoenix, Ariz. 85034
Filed May 29, 1968, Ser. No. 733,011
Int. Cl. B28c 7/00
U.S. Cl. 259—161                              16 Claims

ABSTRACT OF THE DISCLOSURE

A Gunite blender including a hydraulically controlled loading hopper which introduces sand and cement into a tumbling mixer from which the blended or mixed sand and cement is discharged by a conveyor into an enlarged collection hopper for subsequent discharge, by a second conveyor, to a Gunite applying machine. Suitable vibrating units are associated with both hoppers with the various units of the apparatus being independently driven by hydraulic motors.

---

The instant invention generally relates to apparatus for use in conjunction with a Guniting operation, and is more particularly concerned with a device for blending sand and cement for a controlled delivery to the actual Gunite applying machine.

The Gunite process utilizes a uniformly blended mixture of sand and cement which is propelled by a Gunite machine in dry form through a hose to a nozzle where it is mixed with water and sprayed over appropriate reinforcing, forming concrete walls or the like in situ. Various types of Gunite machines or Gunite applying machines are commercially available with it being the primary intention of the instant invention to provide a unique blending apparatus for the controlled supplying of a blended mixture of sand and cement to a Gunite machine.

The blending apparatus of the instant invention comprises a unique combination of features which provide a uniform mix in a substantially automatic manner subsequent to the introduction of the measured amounts of sand and cement into the loading hopper. The apparatus itself is compact and ruggedly constructed for field use, the actual operation being smoothly effected and exactly controlled, through external controls, for effecting the smooth movement of the ingredients therethrough.

Basically, the blending apparatus consists of a hydraulically controlled loading hopper which can be selectively agitated so as to effect a smooth discharge of the sand and cement therefrom into an enlarged tumbler or tumbling mixer which blends the cement and sand. Subsequent to the blending of the cement and sand, the mixture is discharged into an enlarged screened collection hopper from which it is in turn selectively discharged, in accordance with demand, to a Gunite machine for application.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the apparatus;

FIGURE 3 is a front or discharge end elevational view of the apparatus;

FIGURE 7 is a cross-sectional detail taken substantially on a plane passing along line 7—7 in FIGURE 6.

Figure 1:
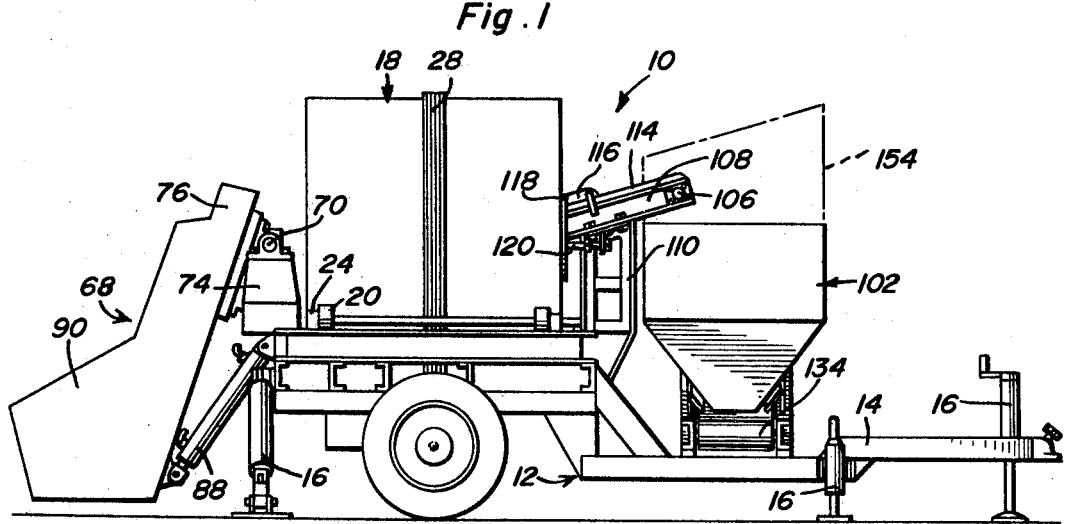
FIGURE 1 is a side elevational view of the Gunite apparatus comprising the instant invention.

Referring now more specifically to the drawings, reference numeral 10 is used to generally designate the apparatus comprising the instant invention. This apparatus 10 will normally be mounted on a wheel supported trailer frame 12 having a forwardly directed hitch mounting tongue structure 14 and a plurality of selectively extensible stabilizers or supplemental supports 16 selectively extensible for supporting engagement with the ground during the use of the apparatus. Such auxiliary supports are also of course retractable to allow for a transporting of the apparatus 10.

The actual mixing or blending to be effected by the apparatus 10 is done by an enlarged drum-like cylindrical tumbler or mixer 18 rollingly mounted between opposed pairs of rubber rollers 20. The tumbler 18 is orientated longitudinally along the frame 12 adjacent the rear and toward one side thereof with the opposed pairs of rollers 20 being free rolling and supported on a pair of laterally spaced shafts 22 in turn supported, through bearing units 24, on a pair of structural frame beams 26 constituting a portion of the trailer frame 12. As will be best appreciated from FIGURE 6, the rollers 20 are located in spaced relation to each other so as to receive or nest a portion of the tumbler 18 therebetween for a free rolling of the tumbler 18 thereon.

The actual controlled driving of the tumbler 18 is effected by means of a plurality of centrally located V-drive belts 28, normally five such belts 28 being provided. The belts 28 extend or are trained about a multiple pulley 30 mounted on a supported shaft 32, the opposite ends of which are coupled to a pair of synchronized hydraulic motors 34. This drive unit, including the pulleys 30, shaft 32 and motors 34, is mounted on a base plate 36 which is in turn fixed to the lower ends of a pair of support arms 38 which are pivotally mounted, at the opposite ends thereof, to pillow blocks 40 fixed to an adjacent frame beam 42. In this manner, the tumbler driving unit will maintain a tension on the drive belts 28. The amount of tension introduced into the belts 28 can be varied from the rear of the frame 12 through a control handle 44. This control handle is fixed to the end of an elongated rod 46 rotatably mounted by a depending bearing block 48 fixed to the rear frame beam 50 and extending longitudinally beneath the tumbler 18. The inner end of the rod 46 is in turn fixed to a laterally directed link 52 which, through an upwardly directed relatively rigid coiled tension spring 54, is engaged with the free end of an elongated control bar 56. This control bar 56 has the opposite end thereof rigidly affixed to the drive unit base 36 whereby upon a swinging adjustment of the control handle 44, a spring-loaded pivotal adjustment of the drive unit will be effected, this in turn directly affecting the tension on the drive belts 28 in an obvious manner. An appropriate notched or apertured arcuate locking strip 58 will be affixed to the rear frame beam 50 along the path of movement of the control handle 44 for a selective locking of the control handle 44 thereto in any appropriate manner, thereby fixing the adjusted position of the drive unit for the tumbler. It will of course be appreciated that the interposing of the relatively stiff spring 54 within the control linkage provides a shock absorbing effect avoiding a possible overtensioning of the belts and assisting in maintaining a constant tenson on the belts should some stretching or elongation thereof occur after a period of use.

Figure 5:
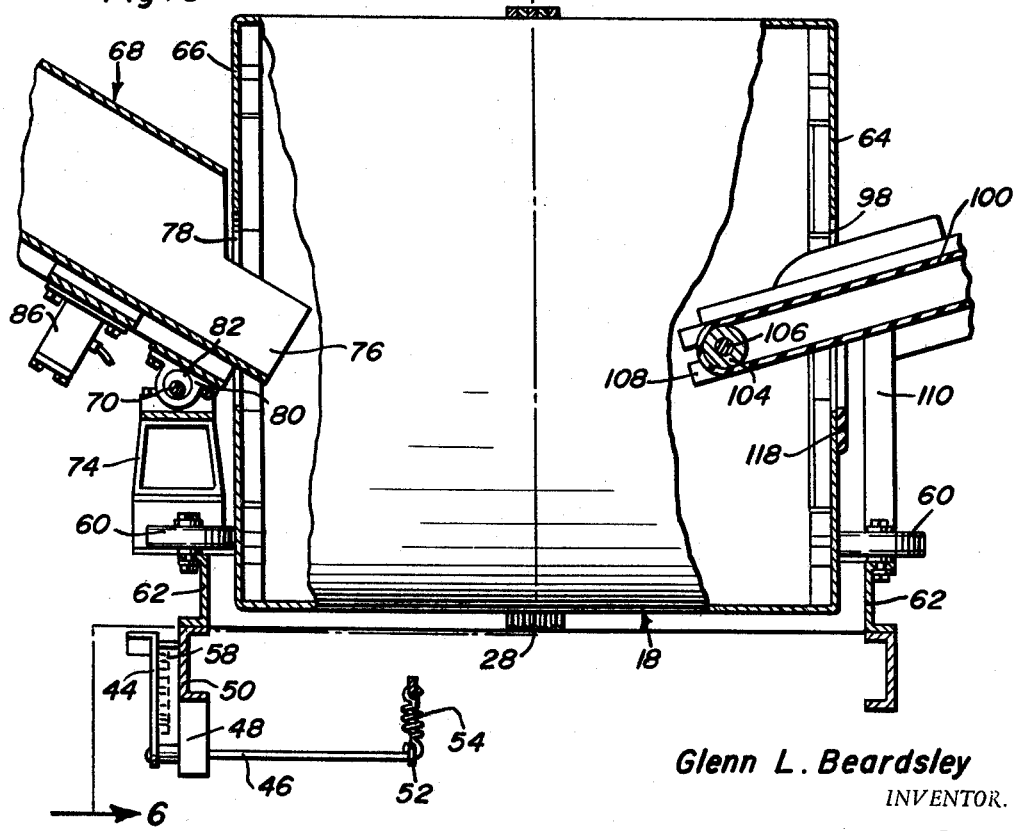
FIGURE 5 is an enlarged cross-sectional view, with a portion in elevation, taken substantially on a plane passing along line 5—5 in FIGURE 2.

With reference to FIGURE 5 in particular, should such be necessary so as to prevent a longitudinal shifting of the tumbler 18, a pair of front and rear positioning rollers 60 can be mounted on transversely extending beams 62 for rolling engagement with the front and rear walls 64 and 66 of the tumbler 18.

Referring now to the rear of the apparatus, an enlarged loading hopper 68 is pivotally mounted on a transversely extending shaft 70 which is in turn rotatably mounted within a pair of opposed bearing units 72 projecting upwardly from an elevated mounting base 74 of a height so as to position the discharge end portion 76 of the loading hopper in alignment and partially through an enlarged central loading opening 78 within the rear wall 66 of the tumbler 18. With reference to FIGURE 5, it will be noted that the actual mounting of the hopper 68 on the shaft 70 is effected by a pair of pillow blocks 80 fixed to the bottom of the hopper 68 at the unloading end thereof. The pillow blocks 80 receive eccentrics 82 fixed to the shaft 70 for rotation therewith within the pillow blocks 80 whereby upon a rotational driving of the shaft 70, through an appropriate hydraulic motor 84 coupled to one end thereof, an actual agitation or slight shaking of the outlet end of the hopper 68 is effected so as to facilitate the transfer of material therefrom into the tumbler or mixer 18. An additional agitation or vibration of the hopper 68 can be provided for through an appropriate vibrator 86 mounted thereon as also illustrated in FIGURE 5.

Figure 4:
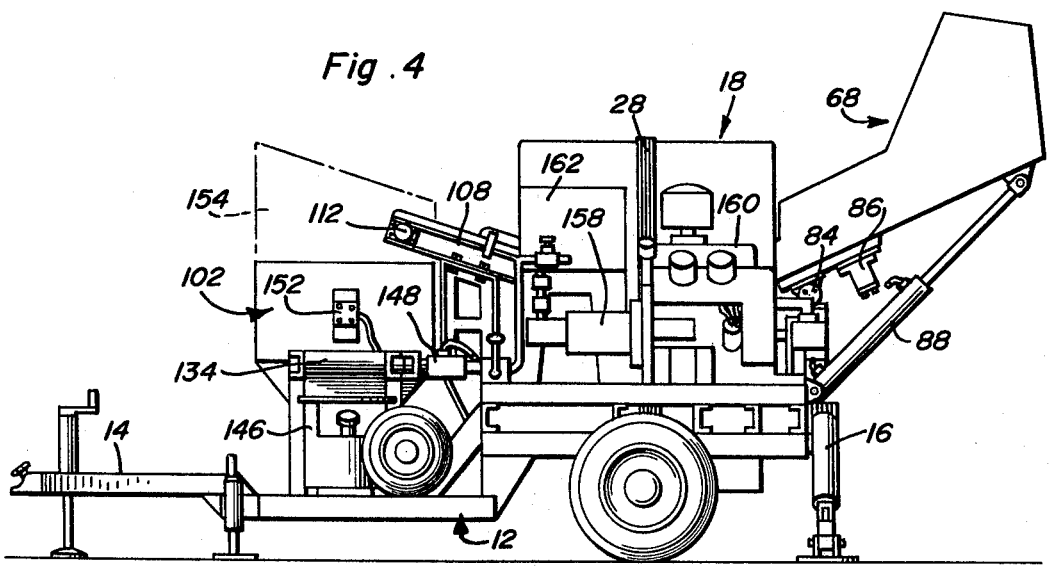
FIGURE 4 is an elevational view of the apparatus opposite from that of FIGURE 1.

The actual positioning of the loading hopper 68 from the lowered material receiving position of FIGURE 1 to the raised material dumping position of FIGURE 4 is effected through a pair of double-acting hydraulic piston and cylinder units 88 pivotally mounted between the outer end of the hopper 68 and the rear portion of the trailer frame.

The hopper 68 is generally funnel-shaped from the enlarged loading end 90 thereof to the relatively narrower discharge end 76. The loading end 90 is enlarged and generally laterally directed relative to the remainder of the hopper 68, presenting a slightly inclined upper wall portion 92 having an enlarged opening 94 therein for the introduction of the material thereto. Thus, the loading end 90 of the hopper 68 presents in effect, in the lowered position of FIGURE 1, an upwardly opening receptacle into which the sand and cement, in the desired proportions, is introduced. In forming this bucket or receptacle like portion, it will be appreciated that the extreme outer end of the loading hopper 68 is closed by an appropriate back wall 96. Upon a loading of the hopper 68, the hopper is pivoted upward to the dumping or unloading position of FIGURE 4 through the two hydraulic rams 88, this in turn resulting in a smooth sliding of the loaded material from the bucket portion into the converging funnel-shaped inner portion which directs the material, through the open inner end 76, into the tumbler 18 itself. The actual dumping of the material, as noted previously, is to be facilitated by an agitation of the loading hopper 68 primarily through the eccentrics 82 on the shaft 70. With reference to FIGURE 5, it will be noted that the unloading or dumping end 76 is actually cut down so as to enable the lower portion thereof to project into the interior of the tumbler 18 while the upper portion thereof is positioned adjacent the rear wall 66 to ensure a proper directing or discharge of the material into the tumbler 18.

The discharge of the mixture from the tumbler 18 is effected through an enlarged opening 98 in the forward wall 64 thereof by means of an upwardly and forwardly inclined endless conveyor or conveyor belt 100 which extends from a point approximately 20 inches into the interior of the tumbler to a point upwardly and forwardly of the tumbler and in overlying relation to an enlarged upwardly opening collection hopper 102. The conveyor 100 extends about inner and outer shaft mounted rollers 104, the shafts 106 of which are mounted between a pair of laterally spaced side beams 108 which parallel the opposite sides of the conveyor belt 100 and are rigidly positioned by an appropriate vertical framework 110 extending upwardly from the vehicle frame. The conveyor 100 is selectively driven either forward or rearward by means of a reversible hydraulic motor 112 coupled to the shaft 106 of the outer roller. Further, in order to assist in confining the mixture to the conveyor 100 until discharged into the collection hopper 102, and inverted angle bar 114 is fixed to each of the side beams 108 and extends in overlying relation to the adjoining edge of the conveyor 100. In addition, elongated vertically extending material guiding or retaining flaps 116 are provided at an upwardly and outwardly directed angle both at and immediately outward of the front wall material discharging opening 98. If deemed necessary, an appropriate elastomeric wiping flange 118 can be adjustably mounted, through bracket mounted adjusting screws 120, for wiping engagement with the front wall 64 about the hole 98 and to a height, on each side thereof, at or slightly above the top of the conveyor.

Figure 6:
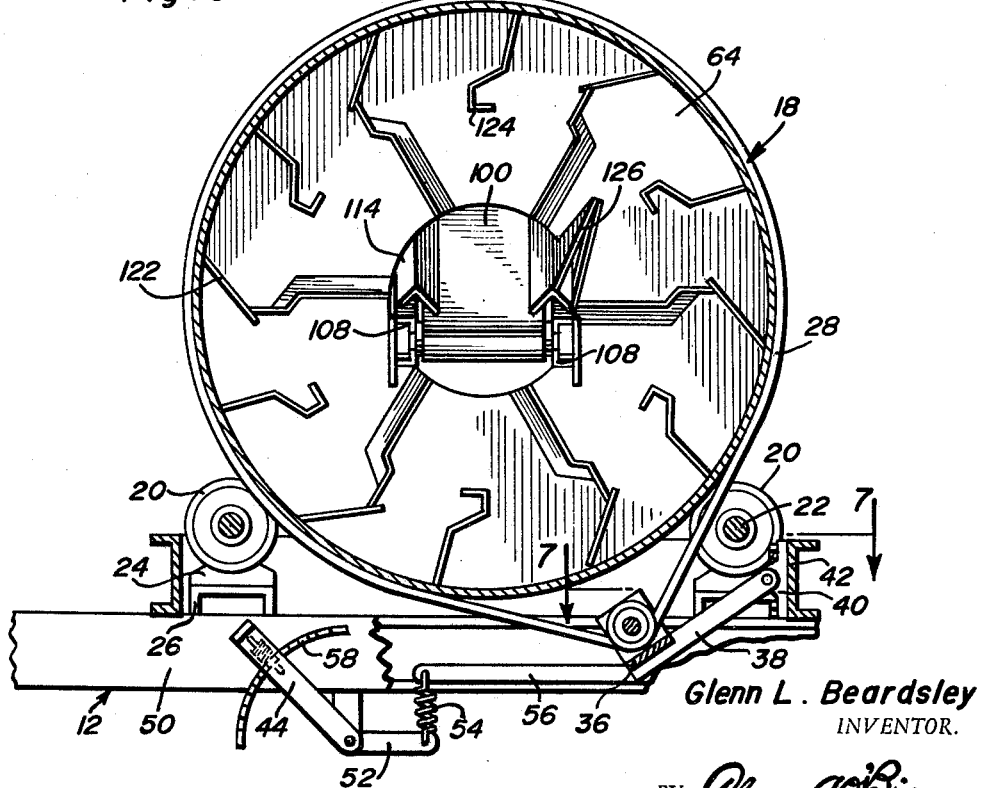
FIGURE 6 is a partial cross-sectional view taken substantially on a plane passing along line 6—6 in FIGURE 5.

The interior of the tumbler 18, noting FIGURE 6, is provided with appropriate material mixing and moving blades or fins 122 in conjunction with material lifting cup-like members 124 toward the front wall 64 for raising the mixed material and discharging this material on the conveyor 100. An appropriate upstanding deflector plate 126 can be provided adjacent the inner material receiving end of the conveyor 100 to ensure proper introduction of the mixed material thereto.

While the actual mixing of the material is taking place, the conveyor 100 is run in reverse or inwardly whereby the material dropped thereonto is moved rearwardly back into the tumbler 18 so as to provide for a continuing mixing thereof. Once the desired blending of the sand and cement has been completed, the conveyor 100 is switched to a forward movement so as to move the mixture upwardly and outwardly into the collection hopper 102 underlying the forward outer end of the conveyor 100.

The collection hopper 102 itself includes an enlarged rectangular upper portion 128 and a generally funnel-shaped lower portion 130 including an inclined lower face 132 which is positioned in vertically spaced overlying parallel relation to an upwardly inclined second conveyor 134. A discharge opening 136 is provided in this inclined wall 132 with the size of this opening 136 being varied through a slidably mounted panel or door 138 bracket mounted on the lower wall 132. The sliding door 138 can of course also be utilized to completely close the discharge opening 136 so as to retain the mixture within the collection hopper 102 until required. It is contemplated that an appropriate mesh or screen cover 140 be provided across the top of the rectangular upper portion 128 of the collection hoper 102 so as to break up any chunks of the mixture before introduction into the collection hopper 102. The collection hopper 102 is supported by several vertical structural members 141 extending between the lower portion of the hopper and a pair of laterally spaced underlying transversely directed upwardly inclined conveyor beams 142 which in turn are supported on the subjacent trailer frame 12. The supported rigid conveyor beams 142 mount the endless conveyor or conveyor belt 134 therebetween through opposed shaft mounted rollers much in the same manner that the conveyor 100 is mounted. This second conveyor unit, as will be best appreciated from FIGURE 3, is orientated transversely across the front of the trailer 12 and inclined upwardly at an angle, extending from beneath the collection hopper 102 to a lateral discharge end positioned over the upper hopper portion 144 of a wheel supported Gunite applying machine 146. The actual driving of the second conveyor 134 is effected by a hydraulic motor 148 coupled to the shaft associated with the upper roller mounted adjacent the upper discharge end of the conveyor 134 as will be best seen in FIGURES 2 and 4. With continued reference to FIGURE 2, it will be noted that material guiding or retaining angle bars 150 are affixed to the opposed channel beams 142 and overlie the corresponding longitudinal edges of the conveyor 134 for the retention of material thereon. Incidently, in order to ensure a smooth flow of the blended material from the collection hopper 102 to the conveyor 134, an appropriate powered vibrator 152 can be mounted on the side thereof. In addition, in order to increase the capacity of the collection hopper 102 should such be necessary, a removable extension 154 can be selectively mounted and locked thereon as suggested in FIGURE 4.

The Gunite applying machine 146 will be substantially conventional in construction and operation, differing only in the contemplated utilization of a hydraulic motor therefor. The actual power plant for the blending apparatus 10 is mounted on a frame supported platform 156 laterally of the tumbler 18. This power plant consists basically of a hydraulic system pump 158 driven by a gasoline engine 160. The reservoir for the hydraulic system is designated by reference numeral 162 and appropriate fluid lines (not specifically illustrated) extend outwardly to the various hydraulic units described heretofore. As will be appreciated, suitable controls for the various hydraulic units are of course conveniently located about the apparatus so as to control the flow of hydraulic fluid thereto and therefrom.

In actual use, the blending apparatus, with the Gunite applying machine 146 mounted on a common frame therewith, is moved to a location convenient to the area where the Gunite work is to be done. The gasoline engine is started, after which the loading hopper is lowered to the ground and sand and cement, in the proper quantities, are poured into the receptacle-like lower portion thereof. The tumbler is then started and the loading hopper hydraulically raised so as to introduce the unmixed material into the tumbler. During the blending or mixing operation, the discharge conveyor 100 is reversely directed so as to assist in the proper blending of the material. After the blending operation, which requires approximately two minutes, the first conveyor 100 is moved forwardly so as to transfer the blended Gunite mix from the tumbler to the collection hopper. From the collection hopper, the blended mix is selectively discharged discharged on the second conveyor 134 and transferred to the Gunite machine as required by the Gunite machine operator.

Incidently, while the use of the blending apparatus has been specially described in conjunction with a Gunite operation, it will appreciated that it can also be utilized in other related environments, such as the blending of plaster, poured concrete mixtures, marbleized type finishes, sandblasting mixtures, lightweight concrete blends, etc.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. Blending apparatus for periodically supplying a mix of two or more ingredients, said apparatus comprising an enlarged material mixing unit, said mixing unit including opposed loading and unloading ends, a loading hopper mounted adjacent to and communicated with the material mixing unit through the loading end thereof, an enlarged collection hopper located in outwardly spaced relation to the unloading end of said material mixing unit, material transfer means communicated with the interior of the material mixing unit through the unloading end thereof and extending therefrom to the collection hopper for the transfer of the mixed material thereto, discharge means communicated wtih said collection hopper and extending outwardly therefrom for use in the periodic discharge and transfer of the mixed material therefrom, said loading hopper including a loading end and an unloading end, and means mounting the unloading end of said loading hopper immediately adjacent the loading end of said material mixing unit for a pivotal movement of the loading end of said hopper between a first lowered material receiving position and a raised material discharging position.

2. The apparatus of claim 1 including means for vibrating said loading hopper.

3. The apparatus of claim 2 wherein said loading hopper is pivotally mounted by means of a transverse shaft at the unloading end thereof and means on the unloading end of the loading hopper rotatably receiving said shaft, the means for vibrating said loading hopper comprising eccentric portions mounted on said shaft and means for effecting a rotational driving of said shaft for producing an eccentric induced movement of the unloading end of said loading hopper.

4. The apparatus of claim 3 wherein said transfer means comprises an endless conveyor extending through and beyond the unloading end of said material mixing unit at an upward inclination.

5. The apparatus of claim 4 wherein said discharge means comprises a second elongated conveyor underlying said collection hopper and extending at an upward and outward inclination relative thereto, and an opening in the lower portion of said collection hopper along with means for selectively closing said collection hopper opening.

6. The apparatus of claim 5 wherein said material mixing unit comprises a cylindrical tumbler, said tumbler being rotatably supported on pairs of opposed roller mounts, and means for rotatably driving said tumbler, said means for rotatably driving said tumbler comprising motor means and associated motor driven pulley means located generally below said tumbler, and belt means encircling said tumbler and pulley means associated with said motor means, said motor means and the associated pulley means being pivotally mounted for gravity induced movement away from said tumbler so as to effect an automatic tensioning of the belt means, and means for varying the tension on said belt means.

7. The apparatus of claim 6 including means for vibrating said collection hopper.

8. The apparatus of claim 1 wherein said loading hopper is generally funnel-shaped from the enlarged loading end to the reduced unloading end, the loading end of said loading hopper defining, in the lowered position thereof, an upwardly opening material receptacle having generally vertical sidewalls and generally horizontal top and bottom walls.

9. The apparatus of claim 1 wherein said transfer means comprises an endless conveyor extending through and beyond the unloading end of said material mixing unit.

10. The apparatus of claim 9 including motor means drivingly associated with said endless conveyor, said motor means being reversible for a selective reverse driving of said conveyor.

11. Blending apparatus for periodically supplying a mix of two or more ingredients, said apparatus comprising an enlarged material mixing unit, said mixing unit including opposed loading and unloading ends, a loading hopper mounted adjacent to and communicated with the material mixing unit through the loading end thereof, an enlarged collection hopper located in outwardly spaced relation to the unloading end of said material mixing unit, material transfer means communicated with the interior of the material mixing unit through the unloading end thereof and extending therefrom to the collection hopper for the transfer of the mixed material thereto, discharge means communicated with said collection hopper and extending outwardly therefrom for use in the periodic discharge and transfer of the mixed material therefrom, said transfer means comprising an endless conveyor extending through and beyond the unloading end of said material mixing unit at an upward inclination, said discharge means comprising a second elongated conveyor underlying said collection hopper and extending at an upward and outward inclination relative thereto, and an opening in the lower portion of said collection hopper along with means for selectively closing said collection hopper opening.

12. The apparatus of claim 11 including a pair of hydraulic motors, one drivingly associated with each conveyor for a selective driving thereof.

13. Blending apparatus for periodically supplying a mix of two or more ingredients, said apparatus comprising an enlarged material mixing unit, said mixing unit including opposed loading and unloading ends, a loading hopper mounted adjacent to and communicated with the material mixing unit through the loading end thereof, an enlarged collection hopper located in outwardly spaced relation to the unloading end of said material mixing unit, material transfer means communicated with the interior of the material mixing unit through the unloading end thereof and extending therefrom to the collection hopper for the transfer of the mixed material thereto, discharge means communicated with said collection hopper and extending outwardly therefrom for use in the periodic discharge and transfer of the mixed material therefrom, said material mixing unit comprising a cylindrical tumbler, said tumbler being rotatably supported on pairs of opposed roller mounts, and means for rotatably driving said tumbler, said means for rotatably driving said tumbler comprising motor means and associated motor driven pulley means located generally below said tumbler, and belt means encircling said tumbler and pulley means associated with said motor means, said motor means and the associated pulley means being pivotally mounted for gravity induced movement away from said tumbler so as to effect an automatic tensioning of the belt means, and means for varying the tension on said belt means.

14. Apparatus for blending two or more materials comprising a material mixing unit and a loading hopper therefor, means mounting said loading hopper adjacent said material mixing unit with one end of said hopper, the discharge end thereof, selectively communicatable with the interior of said material mixing unit for the introduction of material to be mixed thereto, the second end of said hopper constituting a loading end, said means mounting the discharge end of said hopper constituting pivot means for a pivotal movement of said hopper between a lowered material receiving position and an elevated material discharging position, the pivot means mounting said hopper including shaft means with eccentric means thereon, said hopper being rotatably engaged with said eccentric means for enabling said pivotal movement of the hopper, and motor means for rotatably driving said shaft means with said eccentric means thereon for effecting an eccentric reaction movement of the hopper and a vibration of the materials therein.

15. Blending apparatus for supplying a mix of two or more ingredients, said apparatus comprising an enlarged material mixing unit, said mixing unit including opposed loading and unloading ends, a loading hopper mounted adjacent to and communicated with the material mixing unit through the loading end thereof, an enlarged collection hopper located outwardly of the unloading end of said material mixing unit, material transfer means communicated with the interior of the material mixing unit through the unloading end thereof and extending therefrom to the collection hopper for the transfer of the mixed material thereto, discharge means communicated with said collection hopper and extending outwardly therefrom for use in the periodic discharge and transfer of the mixed material therefrom, said transfer means comprising a conveyor extending through and beyond the unloading end of said material mixing unit, said discharge means comprising a second elongated conveyor underlying said collection hopper and extending outwardly relative thereto, and an opening in the lower portion of said collection hopper along with means for selectively closing said collection hopper opening.

16. The apparatus of claim 15 wherein said material mixing unit comprises a cylindrical tumbler, said tumbler being rotatably supported on pairs of opposed roller mounts, and means for rotatably driving said tumbler, said means for rotatably driving said tumbler comprising motor means and associated motor driven pulley means located generally below said tumbler, and belt means encircling said tumbler and pulley means associated with said motor means, said motor means and the associated pulley means being pivotally mounted for gravity induced movement away from said tumbler so as to effect an automatic tensioning of the belt means, and means for varying the tension on said belt means.

References Cited

UNITED STATES PATENTS

| 1,568,653 | 1/1926 | Butler | 259—167 |
| 1,742,420 | 1/1930 | Shafer | 259—167 |
| 2,739,797 | 3/1956 | Kemper | 259—161 |
| 3,363,884 | 1/1968 | Preeman | 259—169 |

ROBERT W. JENKINS, Primary Examiner

U.S. Cl. X.R.

259—3